US012528843B2

(12) United States Patent
Singh et al.

(10) Patent No.: US 12,528,843 B2
(45) Date of Patent: Jan. 20, 2026

(54) PHARMACEUTICAL COMPOSITION COMPRISING P80 PROTEIN

(71) Applicant: Prime Bio, Inc., North Dartmouth, MA (US)

(72) Inventors: Bal Ram Singh, Dartmouth, MA (US); Raj Kumar, Dartmouth, MA (US)

(73) Assignee: Prime Bio, Inc, North Dartmouth, MA (US)

( * ) Notice: Subject to any disclaimer, the term of this patent is extended or adjusted under 35 U.S.C. 154(b) by 117 days.

(21) Appl. No.: 17/024,302

(22) Filed: Sep. 17, 2020

(65) Prior Publication Data

US 2022/0081473 A1 Mar. 17, 2022

(51) Int. Cl.
*C07K 14/33* (2006.01)
*A61K 38/00* (2006.01)
*A61K 45/06* (2006.01)
*C07K 1/18* (2006.01)

(52) U.S. Cl.
CPC ............. *C07K 14/33* (2013.01); *A61K 45/06* (2013.01); *C07K 1/18* (2013.01); *A61K 38/00* (2013.01)

(58) Field of Classification Search
CPC .......... C07K 14/33; C07K 1/18; A61K 45/06; A61K 38/00
See application file for complete search history.

(56) References Cited

U.S. PATENT DOCUMENTS

| | | | |
|---|---|---|---|
| 6,699,966 B1 * | 3/2004 | Singh | A61P 25/00 424/94.1 |
| 6,994,859 B1 | 2/2006 | Singh et al. | |
| 7,531,183 B2 | 5/2009 | Singh et al. | |
| 8,586,081 B2 | 11/2013 | Singh et al. | |
| 9,139,624 B2 * | 9/2015 | Singh | A61P 31/04 |

OTHER PUBLICATIONS

Arnon et al., "Management of Botulinum Toxin Used as a Biological Weapon", JAMA. 2001; 285 (8): 1059-1081.
DasGupta BR, Sugiyama H, "Comparative Sizes of Type A and B Botulinum Neurotoxins", Toxicon. 1977; 15: 357-363.
Fu FN, Sharma SK, Singh BR, "A Protease Resistant Novel Hemagglutinin Purified from Type A Clostridium Botulinum" J of Protein Chemistry. 1998; 7(1): 53-60.
East, AK, Collins, MD, "Conserved Structure of Genes Encoding Components of Botulinum Neurotoxin Complex M and the Sequence of the Gene Coding for the Nontoxic Component in Nonproteolytic Clostridium Botulinum Type F". Current Microbiology. 1994; 29: 69-77.
Fujinaga et al., "The haemagglutin of Clostridium botulinum type C progenitor toxin plays an essential role in binding of toxin to the epithelial cells of guinea pig small intestine, leading to the efficient absorption of the toxin", Microbiology. 1997;143: 3841-3847.
Fujinaga et al., "Molecular Characterization of binding subcomponents of Clostridium botulinum Type C progenitor toxin for intestinal epithelial cells and erythrocytes". Microbiology. 2004; 150; 1529-1538.
Inoue et al., "Molecular Composition of Clostridium botulinum Type A progenitor toxins". Infection & Immunity. 1996; 64 (5): 1589-1594.
Yamaguchi et al., "Effects of Clostridium perfringens Enterotoxin via Claudin-4 on Normal Human Pancreatic Duct Epithelial Cells and Cancer Cells". Cellular & Molecular Biology Letters. 2011;16: 385-397.
Matsumura et al. "The HA Proteins of Botulinum Toxin Disrupt intestinal intercellular junctions to increase toxin absorption" Cellular Microbiology. 2008; 19(2): 355-364.
Ohyama et al., Characterization of Nontoxic-Nonhemagglutinin Component of the two types of progenitor toxin (M and L) Produced by the Clostridium Botilinum Type D CB-16. 1995. 39(7): 457-465.
Fujii et al., Similarity in the Nucleotide sequence of the Gene encoding Nontoxic component of Botulinum Toxin produced by Toxigenic Clostridium butyricum Strain BL6340 and Clostridium Botulinum Type E Strain Mashike. Microbiol Immunol. 1993. 37(5): 395-398.
Mauricio Montal, "Botulinum Neurotoxin: A Marvel of Protein Design". Annu. Rev. Biochem. 2010. 79:591-617.
Niwa et al. "Role of nontoxic components of serotype D botulinumt oxin complex in permeation through a Caco-2 cell monolayer, a model for intestinal epithelium", FEMS Immunol Med Microbiol 49 (2007) 346-352.
Prabakaran et al. "Botulinum neurotoxin types B and E: puri® cation, limited proteolysis by endoproteinase Glu-C and pepsin, and comparison of their identi® ed cleaved sites relative to the three-dimensional structure of type A neurotoxin". Toxicon 39 (2001) 1515±1531.
Genji Sakaguchi, "Clostridium Botulinum Toxins". Pharmac. Ther. vol. 19, pp. 165 to 194, 1983.
Edward J. Schantz1 and Eric A. Johnson, "Properties and Use of Botulinum Toxin and Other Microbial Neurotoxins in Medicine". Microbiological Reviews, Mar. 1992; 56(1): 80-99.
S.K. Sharmaa, M.A. Ramzanb, B.R. Singh., "Separation of the components of type A botulinum neurotoxin complex by electrophoresis". Toxicon (2003) 41: 321-331.
Singh et al. "Physicochemical and Immunological Characterization of the TypeE Botulinum. Neurotoxin Binding Protein Purified from Clostridium botulinum". Journal of Protein Chemistry, 1995; 14(1): 7-18.
Zhang et al. "An efficient drug delivery vehicle for botulism countermeasure". BMC Pharmacology 2009, 9:12: 1-9.

(Continued)

Primary Examiner — Robert A Zeman

(57) ABSTRACT

Present invention relates to a pharmaceutical composition comprising P80 with drugs, dyes, small molecules, biomolecules, proteins or combination thereof. P80 enhances the transportation of molecules associated with it. The P80 is a tight junction modulators to enhance the permeability of the intestinal epithelium so as to facilitate drug delivery. The invention further provides a process for the preparation, isolation and purification of p80 protein.

9 Claims, 2 Drawing Sheets

(56) References Cited

OTHER PUBLICATIONS

Somers E, DasGupta BR. "Clostridium botulinum Types A, B, C1, and E Produce Proteins With or Without Hemagglutinating Activity: Do They Share Common Amino Acid Sequences and Genes?" Journal of Protein Chemistry, 1991; 10(4): 415-425.

Sugawara et al. "Botulinum hemagglutinin disrupts the intercellular epithelial barrier by directly binding E-cadherin" J. Cell Biol. 2010; 189(4): 691-700.

Swaminathan S. "Molecular structures and functional relationships in clostridial neurotoxins". FEBS Journal 278 (2011) 4467-4485.

F N Fu, S K Sharma, B R Singh. A protease-resistant novel hemagglutinin purified from type A Clostridium botulinum, J Protein Chem. Jan. 1998;17(1):53-60. Abstract.

B R Singh, J Foley, C Lafontaine. "Physicochemical and immunological characterization of the type E botulinum neurotoxin binding protein purified from Clostridium botulinum". J Protein Chem. Jan. 1995;14(1):7-18. Abstract.

E Somers, B R DasGupta. "Clostridium botulinum types A, B, C1, and E produce proteins with or without hemagglutinating activity: do they share common amino acid sequences and genes?" J Protein Chem. Aug. 1991;10(4):415-25. Abstract.

Singh et al. "Physicochemical and immunological characterization of the type E botulinum neurotoxin binding protein purified from Clostridium botulinum." J Protein Chem. Jan. 1995;14(1):7-18.

\* cited by examiner

Transport of DrBONT/A formulated with P80 through Caco2 cells

Figure 2

PHARMACEUTICAL COMPOSITION COMPRISING P80 PROTEIN

BACKGROUND OF THE INVENTION

Several strains of an anaerobic bacteria belonging to the genus *Clostridium*, such as *C. botulinum* and *C. baratii*, have been widely studied for their ability to produce a neurotoxin known as the *Botulinum* Neurotoxin (BoNT). When humans or other animals come in contact with these neurotoxins, it is known to result in muscle paralysis by blocking the release of acetylcholine from cholinergic nerve endings (DasGupta et al. 1977). BoNTs have thus been classified by the Centers for Disease Control and Prevention (CDC) as one of the six highest-risk threat agents for bioterrorism (the "category A agents") as a result of their extreme potency and lethality, the ease of production and transport, and the need for prolonged hospital intensive care upon exposure (Arnon et al. 2001). Eight antigenically different BoNT serotypes, produced by *C. botulinum*, have been identified and designated as types AH. The highly homologous primary structure of these serotypes, forms the basis for the three functional domains of BoNT (Strotmeir et al. 2011, Montal 2010).

Seven of the serotypes (A-G) of *botulinum* neurotoxin (BoNT) are produced in the form of a complex with a group of neurotoxin associated proteins (NAPs) (Fujji 1993, Prabakaran et al. 2001). BoNT is produced in three different progenitor toxin or complex types: M, L and LL forms. There are variations in sizes and composition of complexes of different BoNT serotypes (A through G). BoNT/A complex can exist in three forms: M, L or LL; BoNT/B, /C and /D complexes in two forms: L and M; BoNT/E and /F complexes are known to exist only in M form. The M form consists of neurotoxin (150 kDa) and a nontoxic protein component (120 kDa) which is called neurotoxin binding protein (NBP) (Singh et al. 1995a) or nontoxic, non-hemagglutinin component (NTNH) (East and Collins 1994) with 12S molecular size (the molecular size of complex forms is expressed as sedimentation equilibrium values). The L form has a molecular weight of about 500 kDa and a molecular size of 16S. The LL form is about 900 kDa and 19S. The L and LL complexes consist of several hemagglutinin components besides the BoNT and NBP, and exhibit hemagglutinin activity (Somers and DasGupta 1991; Fujii 1995).

In 1998, Singh research group named the proteins other than the neurotoxin present in *botulinum* neurotoxin complex as neurotoxin associated proteins or NAPs (Fu et al. 1998). NAPs have at times been referred to as ANTPs (Associated Nontoxic Proteins) to emphasize their non-toxic property (Poulain et al. 2008). One type of NAPs termed neurotoxin binding protein (NBP) is different from the other NAPs in that it clearly interacts with the neurotoxin portion of BoNT. For example, in the M form of BoNT, the 150 kDa BoNT (100 kDa heavy chain or HC and 50 kDa light chain or LC linked through a disulfide bond) is found in association with a ~120 kDa NBP. NAPs present in BoNT/A comprise of two main groups of proteins (Inoue et al., 1996 and Sharma et al., 2003). :—(i) Hemagglutinins (HA) of 17, 23, 33, 48 kDa (ii) Non-Toxin Non-Hemagglutinin of 138 kDa. While it is known that NAPs do not play a role in the toxin-induced blockade of cholinergic neurotransmission, they do however, play an important role in the protection of BoNTs against the proteases of the Gastro Intestinal (GI) tract during oral poisoning. These proteins thus have the ability to enhance the oral toxicity of the neurotoxin significantly (Sakaguchi, 1982). Three of the HA NAPs are known to interact with intestinal epithelial cells and play an active role in BoNT transport (Fujinaga et al. 1997; Fujinaga et al. 2004; Niwa et al. 2007). Strong support for the functional role of HAs in this regard is provided by the finding that HAs directly bind to E-cadherin and disrupt the intercellular epithelial barrier (Ito et al. 2011; Matsumura et al. 2008; Sugawara et al. 2010).

Of all the NAPs, the 33 kDa hemagglutinin (Hn33 or HA33) is the most abundant. Hn33 is a protease resistant and highly immunogenic type of NAPs that appears to play an important role in the translocation of the neurotoxin across the gut wall enhancing the endopeptidase activity of BoNT and protection of BoNT against proteases. The sequence homology among respective BoNTs and their NAPs range from 55.3% to 98.5%. Although it is believed that the proteins associated with other serotypes have protective effects (similar to that of type A) on the neurotoxin, not much is known about the structure-function of their NAPs.

According to Singh and Zhang (2009), type E *Clostridium botulinum* produces a complex similar to type A complex. Although it has been stated that BoNT/E neurotoxin was associated with one other protein (Sugii et al. 1983; Schantz et al. 1992; and Singh et al. 1995), a study by Singh & Zhang 2009, showed that the type E *botulinum* toxin exists in a complex that comprises the toxin and five neurotoxin associated proteins. The five neurotoxin associated polypeptides were seen to have molecular weights of about 118, 80, 65, 40, and 18 kDa, respectively. The 118 kDa polypeptide is a well-known neurotoxin binding protein that was sequenced previously. The 80, 65, 40, and 18 kDa polypeptides, on the other hand are novel and have been partially sequenced by Singh & Zhang 2009. Present invention provides the structure and possible biological benefits of the 80 kDa BoNT Type E NAPs. This protein was selected as it was found to specifically bind to the Type E neurotoxin (Singh and Yang 2009). The study by Singh and Yang (2009) also revealed that the type E neurotoxin could bind directly to the 80 kDa type E neurotoxin associated protein, rather than associate indirectly with the neurotoxin via polypeptides in the complex. The potential of this polypeptide in disrupting the intercellular epithelial barrier is evidenced by using fluorescence microscopy and atomic force microscopy.

Conformational features of the 80 kDa NAPs, were examined using circular dichroism, and FTIR spectroscopy. These observations are helpful for explaining the various mechanistic processes of this molecule that enable the tight junction disruption that was observed. The secondary structure and tertiary structure was studied using circular dichroism (CD). The physiological activity of the protein was studied using intestinal epithelial cells (CaCo-2).

BRIEF SUMMARY OF THE INVENTION

The main aspects of present invention is to provide a pharmaceutical composition comprising p80 protein with drugs, dyes, small molecules, biomolecules, proteins or combination thereof.

In another aspect of present invention P80 is obtained from BoNT.

In another aspect of present invention is recombinant P80.

In another aspect the nucleotide sequence of p80 is ID no. 1.

In another aspect the amino acid sequence of p80 is ID no. 2. In another aspect of the present invention is that the BoNT is selected from to A-G.

In another aspect of the present invention BoNT is BoNT/E

In another aspect the p80 does not have hemagglutinin activity.

In another aspect of present application provides that p80 is secondary structure is primarily a random coiled αhelix.

In another aspect of present invention is to provide that the pharmaceutical composition further comprises a microsphere encapsulating protein.

In another aspect of present invention, the pharmaceutical composition further comprises surface active agents, chelating agents, salicylates, anti-inflammatory agents, or phenothiazine.

In another aspect of the invention, the pharmaceutical composition further comprises of other associated proteins of *botulinum* toxin complex.

In another aspect of the invention, the pharmaceutical composition further comprises of other proteins of *Clostridium Botulinum*.

In another aspect of the invention is enhanced bioavailability of the drug or combination of drugs, dyes, small molecules, biomolecules, proteins or mixture thereof when administered with p80 or combination thereof.

In another aspect of present invention is the pharmaceutical composition is a lyophilized or gel form.

In another aspect the pharmaceutical composition is stabilized at a pH in between 5.5 and 8.0.

In another aspect of present invention is to facilitate translocation of molecules associated with p80 or Hn across the intestinal epithelial layer.

In another aspect the translocated molecules is selected drugs, dyes, small molecules, biomolecules, proteins or mixture thereof.

In another aspect of the present invention is providing a recombinant p80, an 80 kDa protein.

In another aspect of present invention to provide a process for the preparation of recombinant p80, an 80 kDa protein.

In another aspect of present invention is a process to isolate and purify p80 from BoNT.

In other aspects of present application is to provide a process for preparation of recombinant p80.

In another aspect of the invention is that p80 protein does not show cytotoxicity up to concentration of 300 μM, when treated for 24 hours.

In another aspect a process for the preparation of recombinant p80, comprising steps of
 a. Induction of *E. coli* culture $OD_{600}$=0.6-0.8 by adding 0.2% L-Arabinose;
 b. Growing culture for 20° C. at 16-18 hr;
 c. Lysis of cell paste;
 d. Centrifuge the culture-.
 e. Supernatant is collected;
 f. Supernatant purified using Ni-NTA affinity column;
 g. Combine the pool after elution using 250 mM imidazole,
 h. concentrate the pool by using Centriprep-30; and
 i. Purifying using anion exchange column.

In another aspect the process, wherein BoNT is BoNT/E.

In another aspect of present invention is a method of treatment administrating effective amount of pharmaceutical composition of comprising p80 protein with drugs, dyes, small molecules, biomolecules, proteins or combination thereof.

In another aspect of present invention wherein method of administration is oral route, sublingual and buccal routes, rectal route, vaginal route, ocular route, optic route or nasal route

DETAILED DESCRIPTION OF THE INVENTION

Type E *Botulinum* Neurotoxin (BoNT/E) is a large protein toxin (approximately 150 kDa) that is able to pass through the epithelial barrier in the digestive tract. This toxin is produced by *Clostridium botulinum* along with five neurotoxin associated polypeptides (NAPs). Some of these proteins play an important role in the mechanism by which this large protein toxin crosses the intestinal epithelial barrier. The NAPs found to specifically bind to the Type E neurotoxin has been purified as an 80 kDa protein (p80). Present application provides structure of the P80 protein as well as its interaction with the intestinal epithelial barrier using a cell based model. These in vitro experiments have proved the potential of the P80 to facilitate an increased absorption of BoNT through the paracellular route of the intestinal epithelium. Therefore, p80 could be used as the improvement of a drug bioavailability has been widely carried out through the supplementation of the main therapeutic agent with a secondary agent to improve the rate of the drug going across intestinal epithelial barrier. Present invention provides a composition with p80 which used as bioenhancer.

In the present application, the protein, P80, was purified from the BoNT Type E complex in two steps, using DEAE sephandex A-50 anion exchange column followed by CM Sepharose CL-6B cation exchange column to obtain pure P80 protein. Secondary structure estimates showed P80 to be predominantly a α-helical protein mixed with random coil, this was consistently observed not only from the spectral regions of FT-IR, but also from an additional independent technique (far-UV CD). The protein did not show any cytotoxicity even at high concentrations of 300 nM, when treated for 24 hours. Unlike other NAPs, Hn-33 from type A BoNT, P80 did not show any hemagglutinin activity. This indicates an inability of P80 to bind to specific sugars, a biochemical process involved in cell recognition. In vitro analysis of intestinal epithelial cells was carried out using various microscopic techniques in order to study their potential as a bioenhancer. The P80 and Hn33 treated cells increased localization of the marker molecule along the tight junctions of cells, although to different extents, indicating possible increase of paracellular transportation. The experiments carried out to measure the rate of translocation helped quantitate the rate of translocation of the co-incubated therapeutic molecule (DrBoNT) and indicated a greater rate of translocation in the P80 treated cells when compared to the untreated of Hn33 cells. This evidenced that treated cells alter the extent of trafficking of marker molecules that are co-incubated with the P80. The topographical images obtained through the AFM analysis allowed us to see an increased cell-cell separation as a result of Hn33/P80 treatment on a cell monolayer. The data further support the paracellular transport in P80 when compared to the of Hn33 treatment and even provide a better visual of the changes that the cell might have undergone along its tight junction with time. These images clearly showed separation of cells along the tight junction. On the other hand, the immunofluorescence assays indicated an increased rearrangement of actin cytoskeletal elements in Hn33 treated cells when compared to P80, indicating an alternative mechanism of action of these proteins.

BRIEF DESCRIPTION OF THE DRAWINGS

FIG. 2: Translocation of DrBoNT/A in presence of P80 across the epithelial cell lines Caco 2. A constant amount of DrBoNT/A—488 (200 nM was mixed with serum free media containing 200 nM of P80 and added to the apical side of the transwell insert. After incubating at 37° C., 5% CO2, for 2, 4, 6, 8, and 24 h, aliquots of basal medium was removed and fluorescence of the sample was measured using a plate reader. Measurement was measured in tripticale and fold change with respect to 0 hr was plaotted against the treatment and time.

Figure 1:
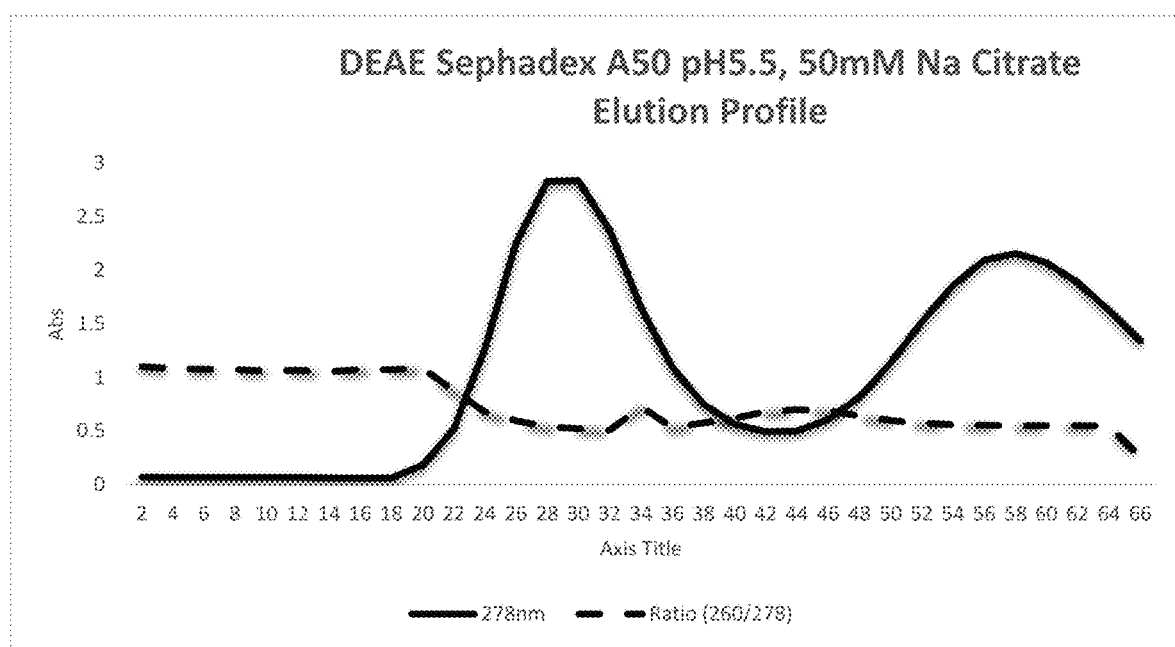
FIG. 1: Elution profile of P80 from DEAE sephadex A 50 column. Second peak was P80. Molecular weight and purity was confirmed for the selected fractions by running 4-20% SDS-PAGE gel. Fraction number 50 to 66 were collected and pooled after checking the purity with SDS-PAGE.

What is claimed is:

1. A non-naturally occurring pharmaceutical composition comprising:
   i) an isolated native and/or a recombinant bioenhancer p80 neurotoxin associated polypeptide (NAP) bound to at least one therapeutic agent that is equal to or less than 150 kDa;
   ii) wherein the at least one therapeutic agent comprises one or more of: drugs and biomolecules; and
   iii) wherein the isolated and/or recombinant p80 NAP is a bioenhancer to the at least one therapeutic agent resulting in the at least one therapeutic agent having a higher bioavailability after being translocated across an intestinal epithelium into a circulating blood as compared to a pharmaceutical composition without the p80 NAP; and
   iv) wherein the pharmaceutical composition excludes a Clostridium botulinum neurotoxin protein of type A-G (BoNT/A-G) as the therapeutic agent.

2. The composition as claimed in claim 1, wherein the bioenhancer p80 NAP is native p80 NAP obtained from a Clostridium botulinum neurotoxin.

3. The composition as claimed in claim 1, wherein the bioenhancer p80 NAP is recombinant p80 NAP obtained from recombinant technologies.

4. The composition as claimed in claim 1, wherein the bioenhancer p80 NAP is native p80 NAP and obtained from Clostridium toxins.

5. The composition as claimed in claim 4, wherein the bioenhancer p80 NAP is a recombinant p80 NAP of 80 kDa molecular weight, and obtained from Clostridium botulinum neurotoxin type E (BoNT/E) complex.

6. The composition as claimed in claim 1, wherein the bioenhancer p80 NAP is native or recombinant p80 NAP, and the pharmaceutical composition further comprises a microsphere encapsulating the native or recombinant p80 protein and the at least one therapeutic agent.

7. The composition as claimed in claim 1, wherein the pharmaceutical composition further comprises one or more Clostridium neurotoxin associated polypeptides (NAPS) comprising: p118, p65, p40, and p18.

8. The composition as claimed in claim 1, wherein the pharmaceutical composition is in a lyophilized or a gel form.

9. The composition as claimed in claim 1, wherein the pharmaceutical composition is stabilized at a pH in between 5.5 and 8.0.

* * * * *